United States Patent
Bhowmick et al.

(10) Patent No.: US 10,187,617 B2
(45) Date of Patent: Jan. 22, 2019

(54) AUTOMATIC DETECTION OF MOVING OBJECT BY USING STEREO VISION TECHNIQUE

(75) Inventors: Brojeshwar Bhowmick, West Bengal (IN); Arijit Sinharay, West Bengal (IN); Arpan Pal, West Bengal (IN); Sambit Bhadra, West Bengal (IN)

(73) Assignee: TATA CONSULTANCY SERVICES LIMITED (IN)

(*) Notice: Subject to any disclaimer, the term of this patent is extended or adjusted under 35 U.S.C. 154(b) by 904 days.

(21) Appl. No.: 13/807,755

(22) PCT Filed: Jun. 30, 2011

(86) PCT No.: PCT/IN2011/000436
§ 371 (c)(1),
(2), (4) Date: Mar. 13, 2013

(87) PCT Pub. No.: WO2012/001709
PCT Pub. Date: Jan. 5, 2012

(65) Prior Publication Data
US 2013/0194419 A1    Aug. 1, 2013

(30) Foreign Application Priority Data

Jun. 30, 2010 (IN) .......................... 1911/MUM/2010
Mar. 29, 2011 (IN) .......................... 0969/MUM/2011

(51) Int. Cl.
*H04N 7/18*     (2006.01)
*G06K 9/00*     (2006.01)
*G06T 7/593*    (2017.01)
*G06T 7/246*    (2017.01)
*G06T 7/277*    (2017.01)
*G06T 7/285*    (2017.01)

(52) U.S. Cl.
CPC .......... *H04N 7/188* (2013.01); *G06K 9/00805* (2013.01); *G06T 7/246* (2017.01); *G06T 7/277* (2017.01); *G06T 7/285* (2017.01); *G06T 7/593* (2017.01); *G06T 2207/10021* (2013.01); *G06T 2207/30196* (2013.01); *G06T 2207/30252* (2013.01); *G06T 2207/30261* (2013.01)

(58) Field of Classification Search
CPC .......... G06K 9/00805; G06K 9/00771; G06K 9/3241; G06K 9/00798; G06T 7/2033; G06T 7/20; G06T 7/2006; G06T 7/0075; G06T 7/208; G06T 7/0044; G06T 2207/30196; G08G 1/166; G01S 13/931
See application file for complete search history.

(56) References Cited

U.S. PATENT DOCUMENTS

| | | |
|---|---|---|
| 7,139,411 B2 | 11/2006 | Fujimura et al. |
| 7,209,221 B2 | 4/2007 | Breed et al. |
| 7,385,680 B2 | 6/2008 | Tamaki et al. |

(Continued)

*Primary Examiner* — Farhan Mahmud
(74) *Attorney, Agent, or Firm* — Hayes Soloway P.C.

(57) ABSTRACT

The present invention discloses a system and method for identifying a moving object in front of a vehicle by using stereo vision based technique. The invention also discloses a method and a system for determining an instantaneous distance between the moving object and the vehicle by processing the image of the moving object through a processor and by filtering and refining the image by using a Kalman filter to remove noise.

10 Claims, 10 Drawing Sheets

(56) References Cited

U.S. PATENT DOCUMENTS

| | | | |
|---|---|---|---|
| 7,418,113 B2* | 8/2008 | Porikli | G06K 9/32 |
| | | | 348/143 |
| 8,164,628 B2 | 4/2012 | Stein et al. | |
| 2005/0100192 A1* | 5/2005 | Fujimura | G06K 9/00369 |
| | | | 382/103 |
| 2006/0187305 A1 | 8/2006 | Trivedi | |
| 2007/0154068 A1* | 7/2007 | Stein | G01C 3/22 |
| | | | 382/106 |
| 2008/0144925 A1* | 6/2008 | Zhu | G06K 9/32 |
| | | | 382/154 |
| 2009/0080701 A1* | 3/2009 | Meuter | G06K 9/3241 |
| | | | 382/103 |
| 2009/0309966 A1* | 12/2009 | Chen | G06T 7/20 |
| | | | 348/135 |
| 2010/0057305 A1 | 3/2010 | Breed | |

* cited by examiner

AUTOMATIC DETECTION OF MOVING OBJECT BY USING STEREO VISION TECHNIQUE

FIELD OF THE INVENTION

The present invention relates to a system and method for tracking of a moving object and determining its instantaneous distance from a vehicle. More particularly, the present invention provides for a system and method for low computational complexity implementation of Kalman filter in post-tracking/measurement stage to remove the noise error developed in the measurement of position of the moving object.

BACKGROUND OF THE INVENTION

The invention relates to an automatic detection of pedestrians along with the measurement of distance from the moving vehicle. Now days, driver and pedestrian safety are becoming more and more important worldwide as the number of road accidents have increased significantly. These accidents are a major cause of loss of life and property. Recognition of pedestrian enables early warning which helps in reducing the probability of such accidents.

There are numerous approaches for detecting pedestrian and measuring their distance from the moving vehicle. Most of them involve use of sensors or cameras for detecting obstacles. These methods also involves use of typically, SIFT, SURF or other sophisticated image processing algorithms that are inherently robust in identifying identical stereo points resulting in accurate triangulation for position estimation. However, these image processing algorithms are due to inherent complex nature and demand exhaustive computation that in turn requires more processing power to retain good time performance of the system. One such method (US20070154068) provides estimating distance to an obstacle from a moving automotive vehicle equipped with a monocular camera. Specifically, the method includes image processing techniques used to reduce errors in real time of the estimated distance. A dimension e.g. a width is measured in the respective images of two or more image frames, thereby producing measurements of the dimension. This method provides a reduction in noise but it involves use of complex equations for measuring distance. Other such methods are less effective in night time (in poor light conditions) and in unfavorable weather conditions.

There is, therefore a need of a method and system to provide automatic detection of pedestrians and their distance from the moving vehicle with less error or noise in the tracked images and should involve less complexity. The method and system should also be capable of working in night mode and at the time of unfavorable weather conditions.

SUMMARY OF THE INVENTION

A method for identifying a moving object in front of a vehicle and determining its distance from the said vehicle is disclosed. The method comprises the steps of capturing real time images falling in range of an image capturing device in a plurality of frames, synchronizing the frames so captured to obtain a synchronized frame or an identical frame. The method further comprises of processing of the captured image in the synchronized frame by or the identical frame by executing processor implemented steps of identifying the image by selected feature wherein the feature includes pixels, refining or tracking the moving object by a kernel based correlation tracking for the identical frames, triangulation of the moving object so detected to get an instantaneous distance between the moving object and the vehicle and refining of the instantaneous distance measured by using a Kalman filter layer to remove noise produced in the image of the moving object.

A system for identifying a moving object in front of a vehicle and determining an instantaneous distance between the moving object and said vehicle is disclosed. The system comprises of an image capturing device adapted to capture images falling in the range of the image capturing device in a plurality of frames, a system clock coupled with the image capturing device for synchronizing the plurality of frames to obtain a synchronized frame. The system further comprises of a processor for processing the captured image in the synchronized frame and capable of executing programmed instructions for filtering and refining of the captured images by using a Kalman filter layer and a calculating unit for determining the instantaneous distance between the moving object and the vehicle.

DETAILED DESCRIPTION OF THE INVENTION

Some embodiments of this invention, illustrating its features, will now be discussed:

The words "comprising", "having", "containing'" and "including", and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a", "an", and "the" include plural references unless the context clearly dictates otherwise. Although any systems, methods, apparatuses, and devices similar or equivalent to those described herein can be used in the practice or testing of embodiments of the present invention, the preferred, systems and parts are now described.

The disclosed embodiments are merely exemplary of the invention, which may be embodied in various forms.

Following are the definitions for the understanding of the invention:

Real time: a system is a real time when it can support the execution of application with time constraints on that execution.

Moving object: any object which is in motion with respect to the vehicle.

Real time image: an image that can be animated on screen at the same speed as the real-world object.

In front of: the position of a moving object which falls directly in the range of the image capturing device.

Instantaneous distance: the distance between the moving object and the vehicle without any delay.

The present invention discloses a method and system (1) for identifying a moving object (2) in front of a vehicle (3). More particularly, the present invention discloses a method and a system (1) for determining an instantaneous distance between the moving object (2) and the vehicle (3). The moving object (2) includes but is not limited to pedestrians, automobile, animal etc.

Figure 1:
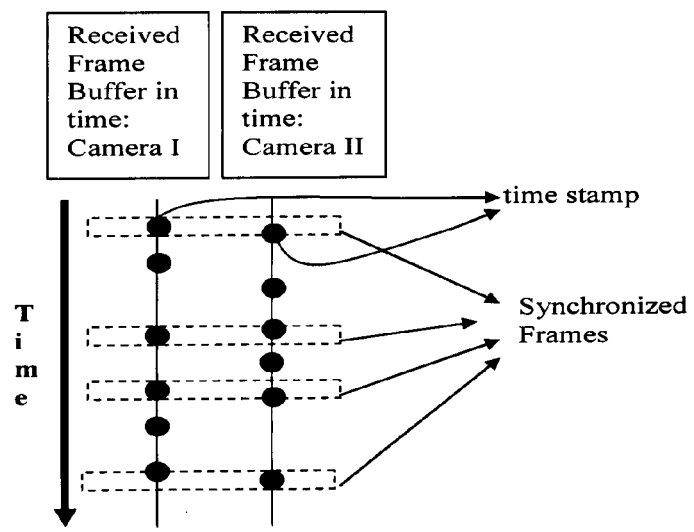
FIG. 1 illustrates the mechanism for picking up the synchronized frames of plurality of image capturing device in accordance with an embodiment of the invention.

In accordance with an aspect, as illustrated in FIG. 1, the method comprises of capturing real time images by means of an image capturing device (4). The image capturing device (4) captures the images which are falling in the range of the image capturing device (4). The range is between zero to infinite. The images are captured in a plurality of frames. An essential requirement for distance measurement is that the frames should be synchronized to obtain a synchronized frame or an identical frame. A mechanism to pick the synchronized frame is implemented so that each received frame from either image capturing device (4) is given a time stamp that is generated via a system clock (5) common to the plurality of image capturing device (4). Images from plurality of image capturing device (4) are buffered and one algorithm looks for the time stamps in the plurality of frames to pick up the synchronized frame.

In accordance with an aspect, the image captured by the image capturing device (4) in the synchronized frame is processed through a processor (6). The moving object (2) is identified by applying an identification or detection algorithm. For the algorithm part, the first step is to collect a feature using a Haar Basis Function on the image of the moving object (2).

The image can be represented in terms of an equation:

For the algorithm part, the first step is to collect features using Haar Basis Functions on an integral image. The feature includes pixels.

$$ii(x, y) = \sum_{x' \leq x, y' \leq y} i(x', y')$$

Where ii is the integral image and i is the original image.

This integral image can be computed faster using the following recursive function.

$$s(x,y)=s(x,y-1)+i(x,y)$$

$$ii(x,y)=ii(x-1,y)+s(x,y)$$

With $s(x, -1)=ii(-1, y)=0$ initially.

On this integral image of the moving object (2) a Haar like feature is computed using block size 12×28.

Figure 2:
FIG. 2 illustrates the sample of Haar features in accordance with an embodiment of the invention.

FIG. 2, illustrates a sample of the Haar like feature where the sum of pixels in the white region are subtracted from the black region to obtain the value of the feature.

Figure 3:
FIG. 3 illustrates the possible region of the human in accordance with an embodiment of the invention.

After having a considerable amount of the feature from both positive (human) and negative (non-human) a classifier AdaBoost is trained to obtain a trained Adaboost. Referring to FIG. 3, the trained adaboost is applied on an unknown image to give a possible region of human.

Figure 4:
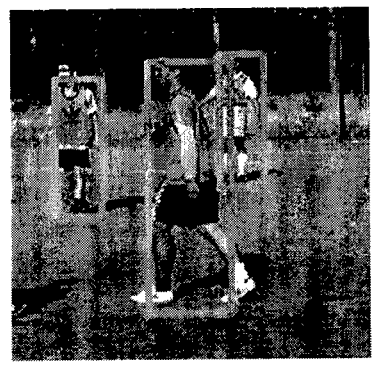
FIG. 4 illustrates an after removal of overlapped human regions in accordance with an embodiment of the invention.
Figure 5:
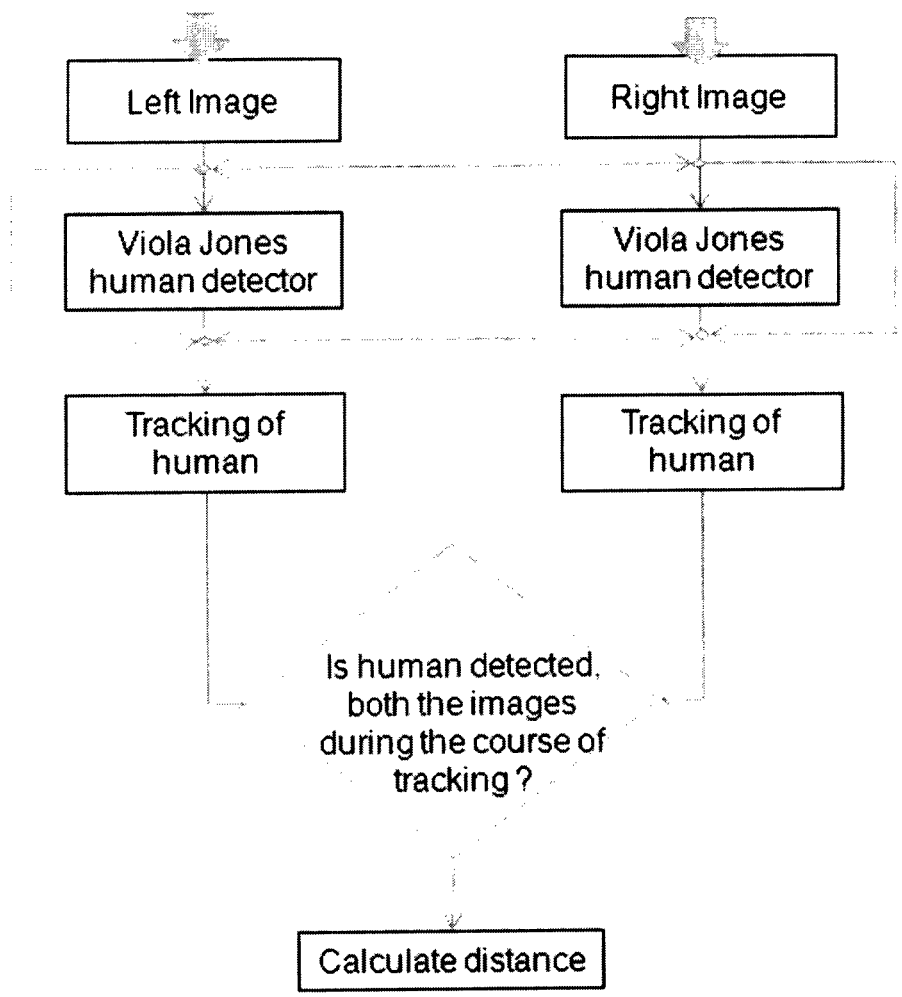
FIG. 5 illustrates software architecture of the detection solution of the moving object and distance calculation in accordance with an embodiment of the invention.
Figure 6:
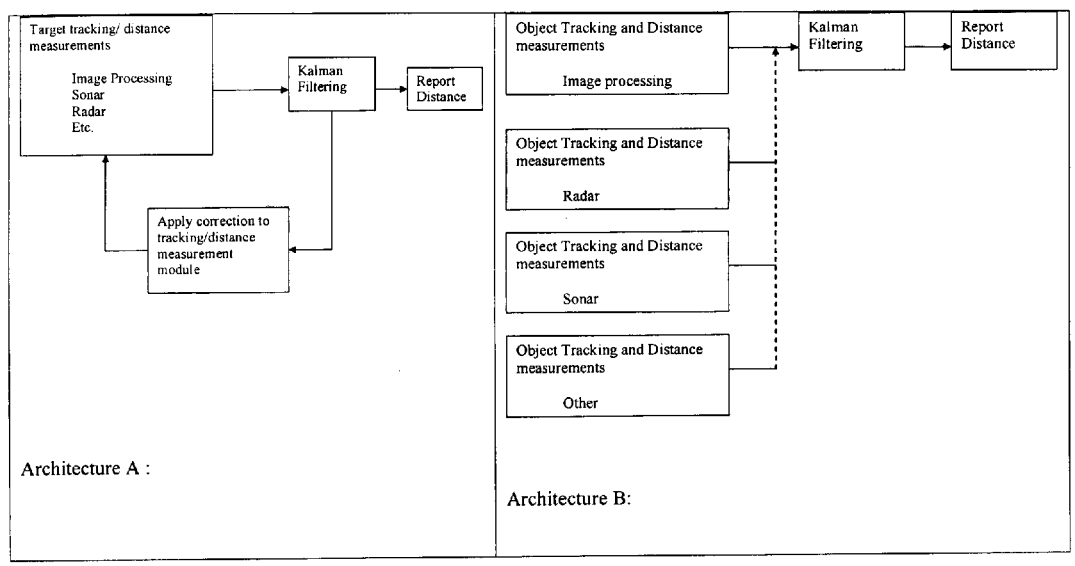
FIG. 6 illustrates the architecture for prior art and the present invention in accordance with an embodiment of the invention.

As illustrated in FIG. 4, the rectangles which overlap significantly are considered as single rectangle and a segmented object is obtained. After the moving object (2) is identified or detected a the further processing is done. A correlation based tracking is used to track the segmented object using a color correlation. A color histogram of the segmented object is computed by using a quantizatized color scheme.

According to the quantizatized color scheme and by way of specific example:

Let h, s, and v be the HSV domain color value, with s and v normalized between [0,1], for a particular R, G, and B value and index is the quantized bin index.

A pure black area can be found in
$v \in [0,0.2]$
index=0
Gray area can be found in
$s \in [0,0.2]$
and
$v \in [0.2,0.8]$
index $\in \lfloor((v\ 0.2) \times 10)\rfloor + 1$
a white area can be found in
$s \in [0,0.2]$ and
$v \in [0.8,1.0]$
index=7
The color area is found in
$s \in [0.2,1.0]$ and
$v \in [0.2,1.0]$, for different h values
The quantization of h, s and v value for different s and v is done as follows:

Let $H_{index}$, $S_{index}$ and $V_{index}$ be the quantized index for different h, s and v values.

$$S_{index} = \begin{matrix} 0, \forall s \in (0.2, 0.5], \\ 1, \forall s \in (0.5, 1.0] \end{matrix}$$

$$V_{index} = \begin{matrix} 0, \forall v \in (0.2, 0.8], \\ 1, \forall v \in (0.8, 1.0] \end{matrix}$$

$$H_{index} = \begin{matrix} 0, \forall h \in (330, 360] \text{ and } h \in [0, 22] \\ 1 \forall h \in (22, 45], \\ 2 \forall h \in (45, 70], \\ 3 \forall h \in (70, 155], \\ 4 \forall h \in (155, 186], \\ 5 \forall h \in (186, 278], \\ 6 \forall h \in (278, 330], \end{matrix}$$

Finally the histogram bin index is given by the following equation $$index = 4*H_{index} + 2*S_{index} + V_{index} + 8;$$

The correlation between two segmented objects is defined as the Bhattacharya's Distance, $d(y)=\sqrt{1-\rho[p(y),\hat{q}]}$, where $\rho[.]$ is the Bhattacharya Coefficient between p and q.

Now, if any moving object (2) is segmented in previous frame and not segmented in current frame it undergoes a kernel based tracking as follows.

A candidate model is created using the same histogram model described earlier in the previous frame. In current frame in the same position and same rectangle as previous a target model is fit.

Now the distance between target model and target candidate histogram is calculated, $d(y)=\sqrt{1-\rho[p(y),\hat{q}]}$, where $\rho[.]$ is the bhattacharya coefficient between p and q.

Now the displacement of the target centre is calculated by the weighted mean.

$$\hat{y}_1 \frac{\sum_{i=1}^{n_h} x_i w_i}{\sum_{i=1}^{n_h} w_i} \text{ where, } w_i \sum_{u=1}^{m} \sqrt{\frac{\hat{q}_u}{\hat{p}_u(\hat{y}_0)}},$$

Once the new location of target is found,
1) Compute target candidate histogram at new location with the same feature space involving histogram equalized image range and bottom hat transformed image.
2) Compute $\rho[\hat{p}(y_1),\hat{q}]$
3) While $\rho[\hat{p}(y_1),\hat{q}] < \rho[\hat{p}(y_o),\hat{q}]$ $$do\ y_1 \leftarrow (y_o + y_1)/2$$

evaluate $\rho[\hat{p}(y_1),\hat{q}]$
4) If $\|y_1 - y_o\| < \varepsilon$, stop

Otherwise set $y_o \leftarrow y_1$ and derive weights, set new location and go to step 1

With the above tracking process, the moving object which is missing is tracked.

Now the image capturing device (4) is calibrated using Zhang's calibration.

The epipolar geometry between two views are established $$m_2^T F m_1 = 0$$

Where F is the fundamental matrix corresponding to the (m1→m2) correspondence points. From F one can compute the matrix E having relation with F, $$F = K_r^{-T} E K_1^{-1}$$

such that, $$E = [t]_x R$$

where t and R are translation and rotation of the image capturing device (4).

Once the moving object is tracked in plurality of image capturing device (4) the Harris corner matching is done within the rectangle of the moving object (2).

The corners are matched using standard correlation and an instantaneous distance between the moving object (2) and the vehicle (3) is calculated using standard stereo-vision based triangulation technique.

In accordance with an aspect, the processing further includes refinement of the instantaneous distance measured between the moving object (2) and the vehicle (3) by using a Kalman filter layer to remove noise created due to complex background and poor light conditions or poor weather conditions for example fog, rain etc. The complex background results in difficulties in identifying the moving object.

Figure 7:
FIG. 7 illustrates the difficulty in finding identical points in the stereo images in adverse conditions without using sophisticated algorithm (SIFT and SURF) in accordance with an embodiment of the invention.

As illustrated in FIG. 7, by way of specific example, a difficulty arises in finding identical points in the stereo images in adverse conditions without using sophisticated algorithm (SIFT, SURF etc.). let the moving object (2) is pedestrian. The pedestrian's black shirt and black pant are the source of error as it is difficult for the algorithm (based on simple correspondence using Harris Corner Detection) to find exact matches on the black shirt/pant in left and right images, hence, causes noticeable error in distance measurements.

A linear system can be described as:
The State equation:

$$x_{k+1} = Ax_k + Bu_k + w_k \quad (1)$$

Output equation;

$$y_k = Cx_k + z_k \quad (2)$$

In the above equations A,B and C are the matrices, k is the time index, x defines the state of the system (1), u is a known input to the system (1), y is measurement output, and w and z are the noise called process noise (w) and measured noise (z). One can not measure x directly, rather one can measure y which in turn is a function of x but can't take the face value of y as it is corrupted by noise z. Running a Kalman filter layer gives a better estimate of the current state x that in turn gives corrected measurements of its components (in our case x consists of position and velocity).

This is how filtering is done on the measured raw data with the technique using the Kalman filtering layer.

In accordance with an embodiment, by way of specific example, the vehicle (3) is considered to be linearly approaching towards the moving object (2). It is also assumed that velocity of the moving object (2) is negligible with respect to the vehicle (3). So in effect, it is a system (1) consist of a vehicle (3) approaching with constant velocity to a fixed object and so the distance between the vehicle (3) and the fixed object monotonously decreases with time. This is normally a fair assumption as the speed of the vehicle (3) is normally much greater than the velocity of the moving object (2). When these two are comparable (as is the case when the vehicle is slowing down, one may not need automatic object detection to avoid accidents).

Figure 8:
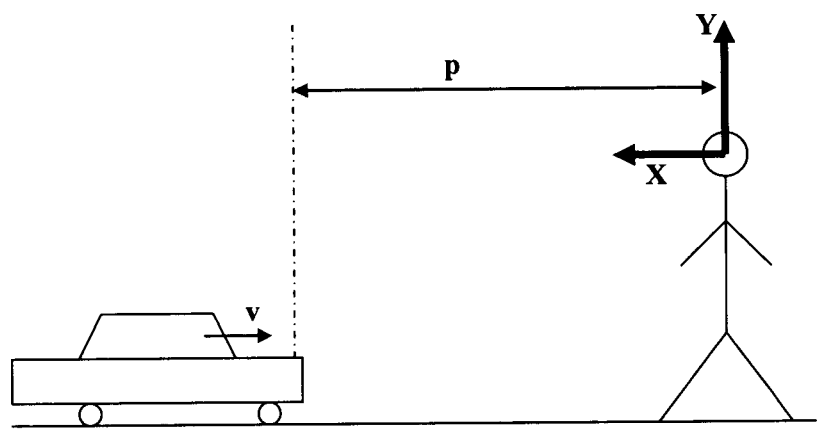
FIG. 8 illustrates a pictorial view of the problem/model wherein p is the depth or distance measurement parameter defining the vehicle to the moving object distance in accordance with an embodiment of the invention.

Referring to FIG. 8, based on the above mentioned assumptions, a co-ordinate system on top of the moving object (2) is defined.

For a zero acceleration model, the instantaneous position and velocity of the vehicle (3) are governed by below mentioned equations.

$$p_{k+1} = p_k + \Delta t v_k + \tilde{p}_k \quad (3)$$

and, $$v_{k+1} = v_k + \tilde{v}_k \quad (4)$$

Where $\Delta t$ is the measurement interval, $p_k$ is the position of the vehicle (3), $v_k$ is the velocity of the vehicle (3), $\tilde{p}_k$ and $\tilde{v}_k$ position and velocity noise. It is to be noted that the stereo vision based distance measurement data serves as the position information (p) of the vehicle (3).

Mathematically speaking, the state of the system (1) is consists of position (p) and velocity (v) as follows:

$$x_k = \begin{bmatrix} p_k \\ v_k \end{bmatrix} \quad (5)$$

Since we measure the position (p) at the $\Delta t$ interval in the output y, our linear equations boils down to:

$$x_{k+1} = \begin{bmatrix} 1 & \Delta t \\ 0 & 1 \end{bmatrix} x_k + w_k \quad (6)$$

$$y_k = [1 \ 0] x_k + z_k \quad (7)$$

where $z_k$ is measurement noise.

Comparing the equations (1,2) with equations (6,7) we note that:

$$A = \begin{bmatrix} 1 & \Delta t \\ 0 & 1 \end{bmatrix}, C = [1 \ 0], B = NULL \text{ matrix}$$

To start the Kalman filtering we need a prior knowledge of three more parameters, i.e. the initial state x, process noise covariance Q and measurement noise covariance R.

For every moving object (2) to be detected, we set the initial position with the first measured distance and we set initial velocity to zero as we didn't have any mechanism/instrumentation to feed vehicle's (3) instantaneous velocity to the algorithm in real time and we find it better to leave it as zero and let the filter adapt to the velocity after a few iteration.

Process noise covariance (Q) and measurement noise covariance (R) are given as:

$$Q = E(w_k w_k^T) \text{ and } R = E(z_k z_k^T) \quad (8)$$

Where $w_k^T$ and $z_k^T$ is transpose of $w_k$ and $z^k$. And E(.) signifies expected value.

Measurement noise covariance is relatively easy to evaluate as it would be the square of standard deviation in measured data. We have measured it offline (the actual process of tuning it is described in sec V) and fed the value in the algorithm as a constant throughout the simulation (true for all moving objects).

We are now only left with calculating the process noise covariance. This is also determined offline and fed to the algorithm as a constant value (true for all pedestrians). The detail of tuning it is described in sec V. Process covariance is give by:

$$Q = E(xx^T) = E\left( \begin{bmatrix} p \\ v \end{bmatrix} [p \ v] \right) = E \begin{bmatrix} p^2 & pv \\ vp & v^2 \end{bmatrix} \quad (9)$$

The basic parameter to be assumed/experimented is the noise in velocity so that Q can be estimated. Say velocity noise (i.e. the standard deviation in velocity) is v_noise.

Since the position is proportional to time interval $\Delta t$ times velocity and the velocity noise is v_noise, the variance in position is a=$(\Delta t)^2 \cdot$(v_noise)$^2$. Next, we calculate the variance in velocity as b=(v_noise)$^2$. Finally, the covariance of the position noise and velocity noise is equal to the standard deviation of the position noise times the standard deviation of the velocity noise, which can be calculated as c=($\Delta t \cdot$v_noise)$\cdot$(v_noise)=$\Delta t \cdot$(v_noise)$^2$. Combining these equations we have:

$$Q = \begin{bmatrix} a & c \\ c & b \end{bmatrix} \quad (10)$$

The v_noise parameter is determined offline to choose an optimum value for Q. This can be treated as an offline training process done on some captured data, which is then used as a constant always and applied on the real data.

Figure 9:
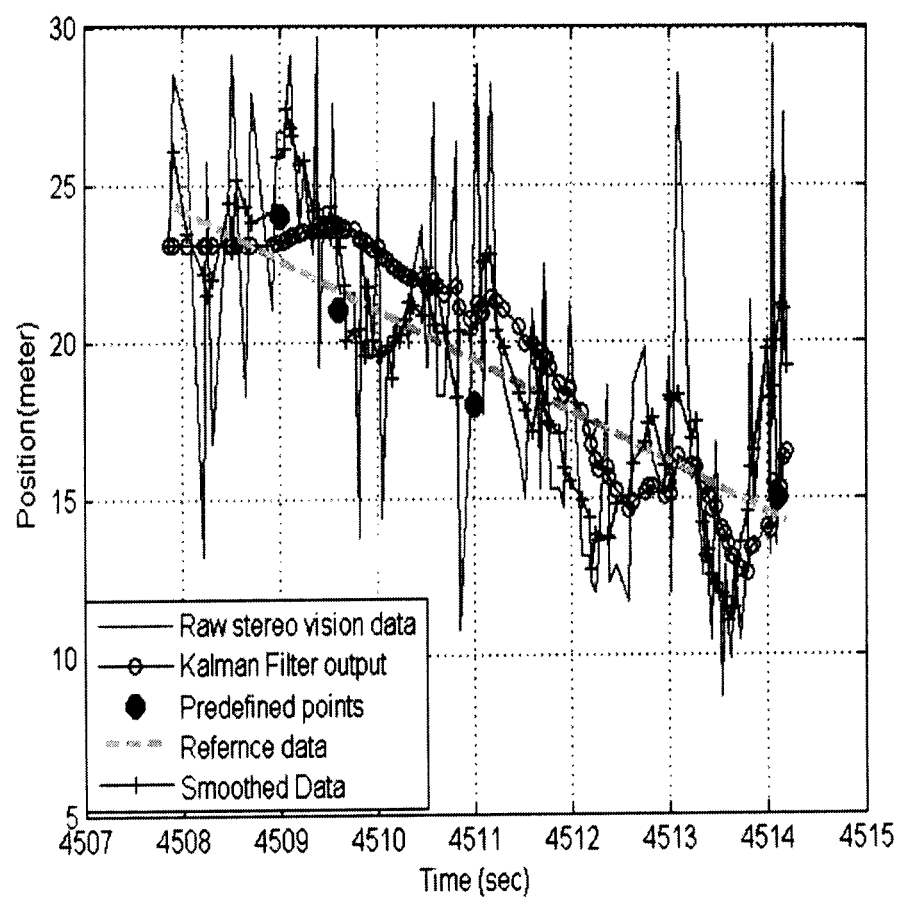
FIG. 9 illustrates significant enhancement on error reduction using the technique of Kalman filter layer output.

FIG. 9 illustrates the results depicting significant enhancement in error reduction using the technique of Kalman filter layer. The red dots represent the reference time-position data which were pre-marked on the pathway of the moving object (2). Based on these, points have been fitted into a linear curve (following equation 3) to serve as a reference data set. Any deviation from this fitted curve is taken as error in the measured data set. To be specific, if at $t_i$ the reference position is $p_i^r$ and the measured position is $p_i^m$ for i=1 to n, then the total error is calculated as:

$$\text{total\_error} = \sum_i (p_i^r - p_i^m)^2 \quad (11)$$

To get physical significance (much like root mean square quantity) we have further modified the total error to get final error (in meters) as:

$$\text{error} = \sqrt{(\text{total\_error}/n)} \quad (12)$$

In accordance with an aspect, the present invention also discloses a system (1) for identifying a moving object (2) in front of a vehicle (3). More particularly, the present invention discloses a system (1) for determining distance between the moving object (2) and the vehicle (3).

Figure 10:
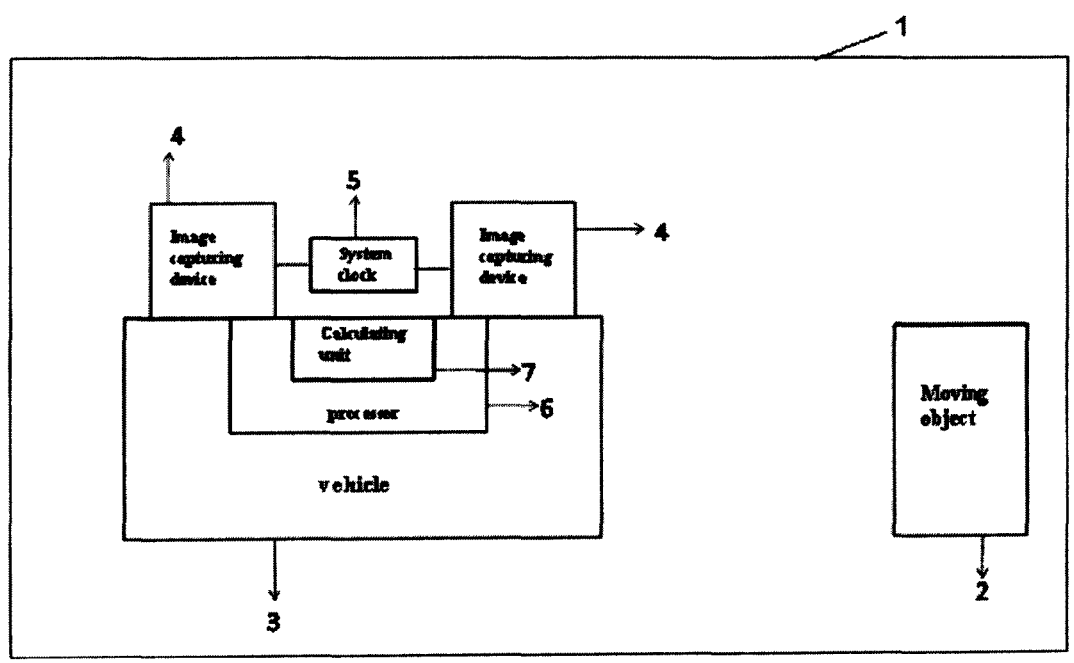
FIG. 10 illustrates the simpler architecture of the system in accordance with an embodiment of the invention.

Referring to FIG. 10 the system comprises of an image capturing device (4) adapted to capture images falling in the range of the image capturing device (4) in a plurality of frames, a system clock (5) coupled with the image capturing device (4) for synchronizing the plurality of frames to obtain a synchronized frame or an identical frame, a processor (6) for processing the image of the moving object (2) and to filter the instantaneous distance between the moving object (2) and the vehicle (3) and a calculating unit for determining the distance between the moving object (2) and the vehicle (3).

In accordance with an embodiment, the system (1) comprises of plurality of image capturing device (4). The image capturing device (4) includes a camera. The camera is mounted on the vehicle (3) and is in motion.

In accordance with an embodiment, the system (1) further comprises of a control unit (7) for measuring and fixing steering angles and velocity of the vehicle (3) based on the dimensions measured by the Kalman filter layer.

By way of specific example, let us assume the moving object (2) to be a pedestrian. Pedestrian can be assumed to be fixed relative to the vehicle (3) as the relative velocity for the vehicle (3) is way higher than the pedestrian who is walking. In that case the average rate of change of the vehicle-pedestrian distance (Z) determines the velocity of the vehicle (3). We get Z for the detected pedestrians and we also have timestamps for each measurements (t). So the velocity (V) can be determined using those information as described below:

Speed can be measured as:

Say, the algorithm has detected n pedestrians with corresponding vehicle-pedestrian distance as $z^{t1}_1, z^{t1}_2 \ldots z^{t1}_n$ in timeframe t1 (can be easily seen from the timestamp) and $z^{t2}_1, z^{t2}_2 \ldots z^{t2}_n$ in timeframe t2, so the speed (s) of the vehicle can be determined as:

$$S = \left[\sum_i^n \frac{z_i^{t2} - z_i^{t1}}{t2 - t1}\right] / n$$

Steering angle may be calculated as:

This can be measured by measuring the optical flow. Let opticalFlowLeft be the optical flow for the left half of the image and opticalFlowRight be the optical flow for the right half of the image. Then the steering angle (theta) can be computed as:

$$\text{theta} = \frac{opticalFlowLeft}{opticalFlowRight}$$

Velocity or direction may be calculated as:

Combining the speed (s) and steering angle (theta) information gives the velocity/direction information of the vehicle (3).

In accordance with an embodiment, the system (1) further comprises of an alrm generating device which may be a module for alerting an operator of the vehicle by generating an alrm.

Best Mode/Example of Working of the Invention

The system of the present invention employs 10 points smoothing (moving average filter) directly on the raw data and calculated the error to see how this naïve approach compares with the Kalman output. Table 1 shows a comparative study on the error. This shows Kalman technique to be the best candidate to reduce measurement error to a significant level.

Implemented on a on a 2 GHz x86 processor, the proposed system was able to accurately detect and track pedestrians from a vehicle moving at 25 km/hr and the processing time taken was less than 200 msec, which is fast enough for generating pedestrian alarms.

TABLE 1

Error comparison table

| Measurements | error (m) |
| --- | --- |
| Raw stereo vision output | 4.45 |
| Moving average smoothed output | 2.48 |
| Kalman filter output | 1.38 |

Figure 11:
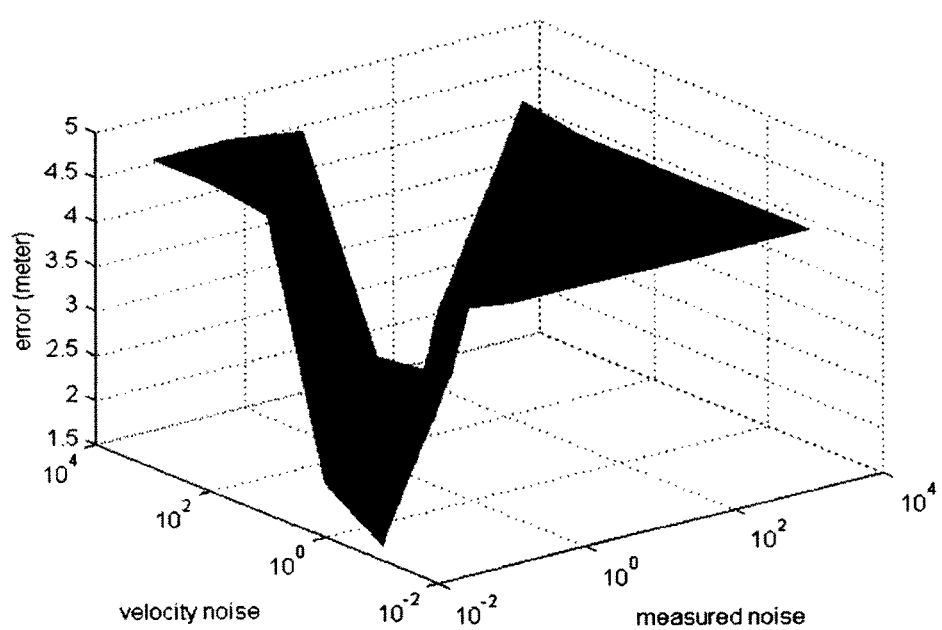
FIG. 11 illustrates a 3D plot for showing the effect on error while varying process and measurement noise in accordance with an embodiment of the invention.

To have an optimize Q, and R as input to the Kalman filter we have varied Q (through v_noise) and R in a wide range (0.01 to 1000) through pure simulation and calculated the error based on the reference data set. The result is plotted in FIG. 4. X, and Y axis are represented in log scale to cover the wide dynamic range representing Q and R. This shows a region where error is minimum. We have then fine tuned the R and Q further (trial and error method) and frozen those parameters. While tuning for R further, we chose R to be close to the actual measurements (i.e. square of standard deviation in the data) so that it holds its physical significance. When the same settings $$R = 322.4267, \text{ and } Q = \begin{bmatrix} 0.0010 & 0.0235 \\ 0.0235 & 0.5625 \end{bmatrix}$$

applied on other moving object it also showed good results as illustrated in FIG. 11.

Figure 12:
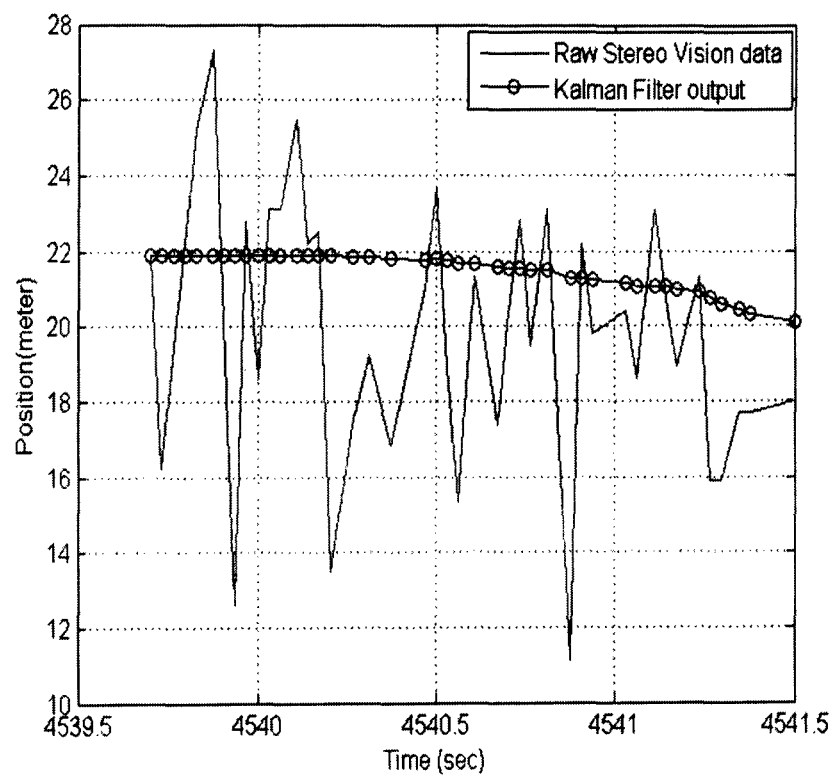
FIG. 12 shows the effect of applying tuned parameters on an arbitrary moving object.
Figure 13:
FIG. 13 illustrates the detection of the moving object and reporting their distance in real time in accordance with an embodiment of the present invention.

FIG. 12 illustrates the detection of the moving object (2) and reporting their distance from the vehicle (3) in real time.

The preceeding description has been presented with reference to various embodiments of the invention. Persons skilled in the art and technology to which this invention pertains will appreciate that alterations and changes in the described process and methods of operation can be practiced without meaningfully departing from the principle, spirit ans scope of this invention.

We claim:

1. A method for identifying a moving object in front of a vehicle and determining an instantaneous distance of the moving object from the said vehicle, the method comprises the steps of:

capturing real time images of the moving objects, falling in range of an image capturing device in the form of a plurality of frames;

synchronizing each frame of the captured plurality of frames to obtain a synchronized frame or an identical frame, wherein each frame of the captured plurality of frames is assigned a time stamp such that the time stamp identifies a synchronized frame corresponding to each frame of the captured plurality of frames; and processing the captured plurality of frames in the synchronized frame by executing processor implemented steps of:

identifying the moving object by a feature collected from the image of the moving object, wherein the feature includes pixel;

matching the features collected from the image of the moving object by using a standard correlation, wherein the matching is a Harris corner matching;

refining and tracking the moving object by color correlation and a kernel based correlation tracking if the moving object is segmented in a previous frame and not segmented in a current frame by:

creating a candidate model using a histogram model corresponding to the previous frame to obtain a target candidate histogram, wherein the target candidate histogram is a color histogram and wherein the color histogram of the segmented object is computed by a quantized color scheme;

calculating distance between the target candidate histogram and a target model, wherein the target model corresponds to the current frame having identical position as the previous frame; and obtaining a tracked moving object by calculating displacement of the target model using the calculated distance to obtain a new position for the target model;

stereo-vision based triangulation of the tracked moving object to obtain an instantaneous distance between the moving object and the vehicle;

determining direction of the vehicle by calculating speed of the vehicle using an average rate of change of instantaneous distance between the moving object at each time frame for the assigned time stamp and steering angle by using an optical flow of each frame; and refining the instantaneous distance corresponding to the direction of the vehicle using a Kalman filter layer output to remove noise developed in the measurement of the instantaneous distance.

2. The method of claim 1, wherein identifying the moving object further comprises of collecting plurality of feature obtained by subtracting sum of pixels in white region from the sum of pixels in black region.

3. The method of claim 1, wherein the method further comprises of measuring and fixing steering angles and velocity of the vehicle based on the filtering and refinement of the instantaneous distance by using the Kalman filter layer output.

4. The method of claim 1, wherein the method further comprises of alerting an operator of the vehicle by generating an alarm.

5. A system for identifying a moving object in front of a vehicle and determining the instantaneous distance between the moving object and the said vehicle, the system comprises of:

an image capturing device adapted to capture images of the moving object falling in the range of the image capturing device in the form of a plurality of frames;

a system clock coupled with the image capturing device for synchronizing the plurality of frames by:

synchronizing each frame of the captured plurality of frames to obtain a synchronized frame or an identical frame, wherein each frame of the captured plurality of frames is assigned a time stamp such that the time stamp identifies a synchronized frame corresponding to each frame of the captured plurality of frames; and identifying the moving object by a feature collected from the image of the moving object, wherein the feature includes pixel;

matching the features collected from the image of the moving object by using a standard correlation, wherein the matching is a Harris corner matching;

refining and tracking the moving object by color correlation and a kernel based correlation tracking if the moving object is segmented in a previous frame and not segmented in a current frame by:

creating a candidate model using a histogram model corresponding to the previous frame to obtain a target candidate histogram, wherein the target candidate histogram is a color histogram, and wherein the color histogram of the segmented object is computed by a quantized color scheme;

calculating distance between the target candidate histogram and a target model, wherein the target model corresponds to the current frame having identical position as the previous frame; and obtaining a tracked moving object by calculating displacement of the target model using the calculated distance to obtain a new position for the target model;

stereo-vision based triangulation of the tracked moving object to obtain an instantaneous distance between the moving object and the vehicle;

determining direction of the vehicle by calculating speed of the vehicle using an average rate of change of instantaneous distance between the moving object at each time frame for the assigned time stamp and steering angle by using an optical flow of each frame;

a processor for processing the captured image in the synchronized frame and capable of executing programmed instructions for filtering and refining the instantaneous distance measured between the moving object and the vehicle corresponding to the direction of the vehicle by using a Kalman filter layer; and a calculating unit for determining the instantaneous distance between the moving object and the vehicle.

6. The system of claim 5, wherein the system further comprises of a plurality of image capturing device.

7. The system of claim 5, wherein the image capturing device includes a camera.

8. The system of claim 5, wherein the camera is mounted on the vehicle and is in motion.

9. The system of claim 5, wherein the system further comprises of a control unit for measuring and fixing steering angles and velocity of the vehicle based on the filtering and refinement of the instantaneous distance by using the Kalman filter layer after determining the instantaneous distance through the stereo-vision based triangulation.

10. The system of claim 5, wherein the system further comprises of an alarm generating device for alerting an operator of the vehicle by generating an alarm.

* * * * *